J. BROGDEN
CABINET
Dec. 22, 1931.
Re. 18,293
Original Filed Dec. 28, 1926 2 Sheets-Sheet 1
FIG. I.
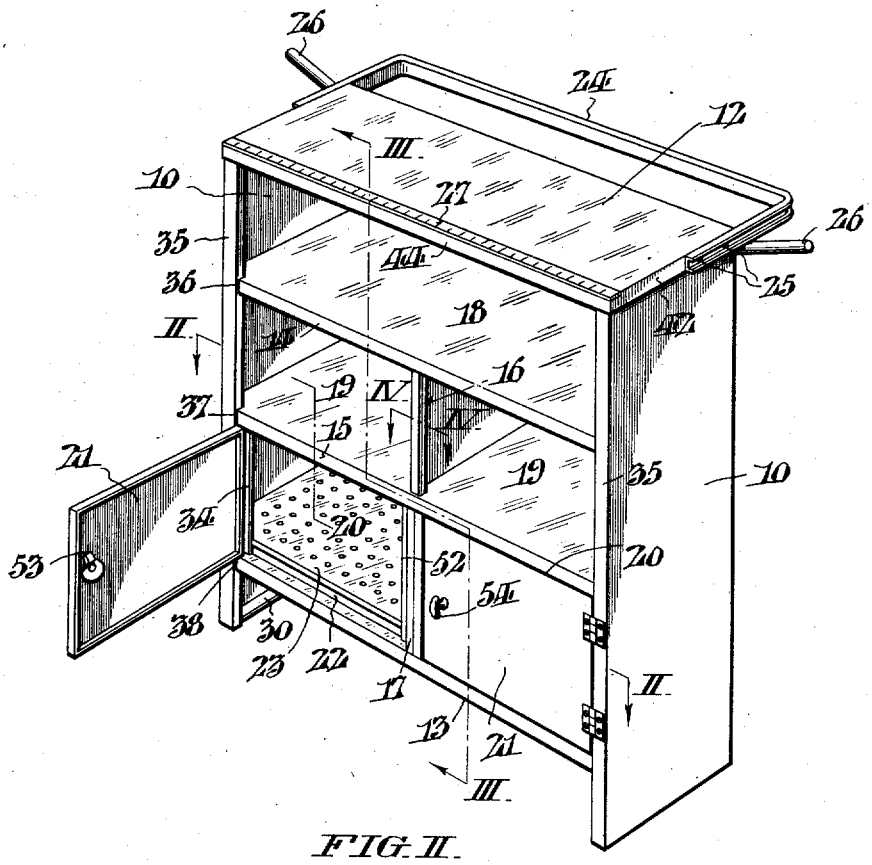
FIG. II.
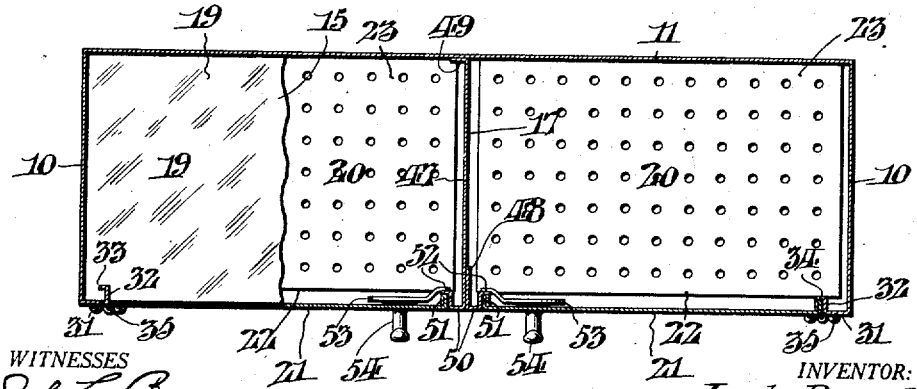
WITNESSES
John C. Bergner
John A. Weidler
INVENTOR:
Joah Brogden,
BY Fraley & Paul
ATTORNEYS.

Dec. 22, 1931.
J. BROGDEN
CABINET
Re. 18,293
Original Filed Dec. 28, 1926 2 Sheets-Sheet 2
FIG. III.
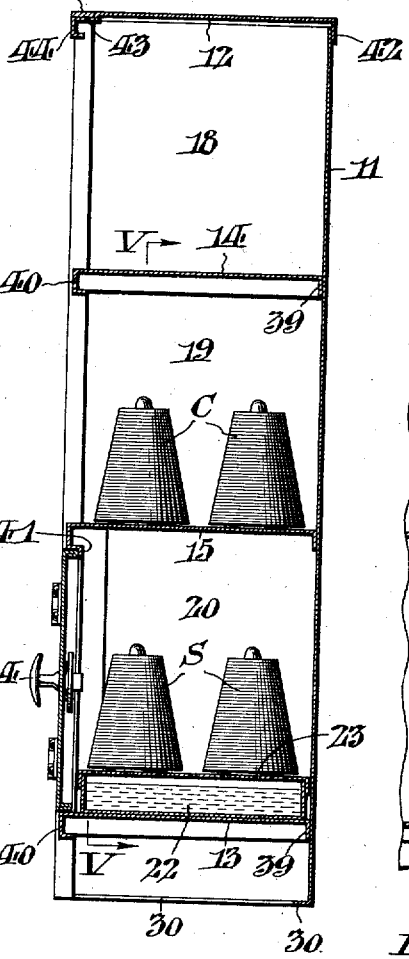
FIG. VII.
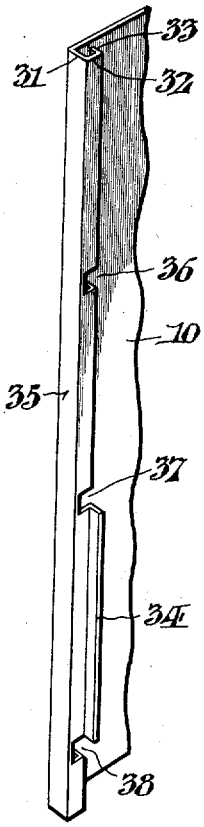
FIG. V.
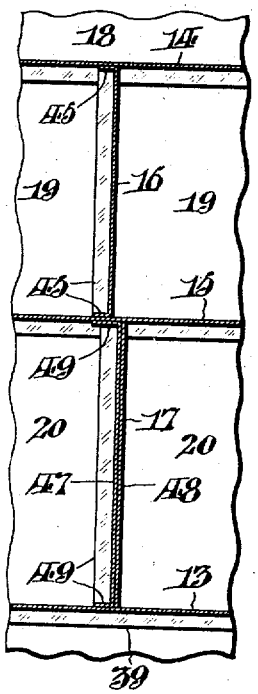
FIG. IV.
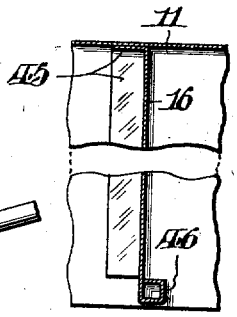
FIG. VI.
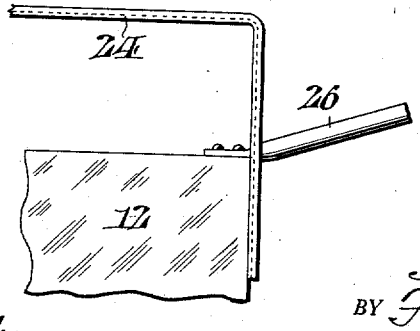
WITNESSES
John C. Bergner
John A. Weidler
INVENTOR:
Joah Brogden,
BY Fraley & Paul
ATTORNEYS.

Reissued Dec. 22, 1931 Re. 18,293

UNITED STATES PATENT OFFICE

JOAH BROGDEN, OF MELROSE PARK, PENNSYLVANIA, ASSIGNOR TO DAVID LUPTON'S SONS COMPANY, OF PHILADELPHIA, PENNSYLVANIA, A CORPORATION OF PENNSYLVANIA

CABINET

Original No. 1,712,024, dated May 7, 1929, Serial No. 157,444, filed December 28, 1926. Application for reissue filed October 10, 1930. Serial No. 487,883.

This invention relates to cabinets of a type more particularly useful as work benches for knitters and other textile workers.

In this connection, I aim to provide a structure which is compact, sanitary and verminproof, sturdy and durable, adapted for economical manufacture from sheet metal, and serviceable as a work bench and as a cabinet for tools, personal belongings, etc., necessary to the knitters, as well as for storage and preparation of materials to be worked by them.

Other objects and advantages of my invention will be manifest from the detailed description hereinafter of the embodiment shown in the accompanying drawings, whereof Fig. I shows a perspective view of the cabinet.

Fig. II is a staggered plan sectional view of the same, taken in accordance with the line and arrows II—II in Fig. I.

Fig. III is a transverse section through the structure, as indicated by the line and arrows III—III in Fig. I.

Fig. IV is a fragmentary detail plan section, taken as indicated by the line and arrows IV—IV in Fig. I.

Fig. V is a partial longitudinal section, in accordance with the line and arrows V—V in Fig. III.

Fig. VI is a fragmentary view showing certain details at the upper rear corners of the cabinet; and, Fig. VII is a fragmentary perspective view of one of the end walls of the cabinet.

As shown in these illustrations, the cabinet is rectangular in form, comparatively long and narrow, and constructed entirely from sheet material, with end walls 10 which are continuous with the back 11, a top 12 and a bottom 13, the latter being preferably located at a slight elevation from the floor. The space bounded by these walls is subdivided by horizontal and vertical partitions 14, 15, and 16, 17 in such a manner as to afford an upper compartment 18 that extends the full length of the structure, a pair of horizontally-contiguous intermediate compartments 19, 19, and a pair of similarly-disposed lower compartments 20, 20. The upper compartment 18 is preferably left open for ease of access from the front of the structure and may be utilized for storage of finished manufactures, such as stockings for example, tools, accessories, and personal belongings necessary or useful to a knitter. The intermediate compartments 19, 19 are likewise left open, and are intended for storage of cops or cones C (Fig. III) of cotton or other yarn that does not require conditioning as a pre-requisite to ready working in knitting or other textile machines. However, movable front closures are provided for the space between the bottom 13 and the horizontal partition 15 next above it, consisting of swinging doors 21, 21 to the lower compartments 20, 20, which are intended for the storage and conditioning of packets S of silk, rayon, etc.; and as such materials are rendered more pliable by application of moisture, false bottoms in the form of individually removable water pans 22 are provided, which are comparatively shallow in depth and are covered by perforated lids or tops 23.

At the back, the cabinet is equipped with a horizontally-projecting hanger rail 24 useful for temporarily supporting the finished stockings or other work, and attached to the cabinet at its rear corners. In the present instance, this hanger rail 24 is fashioned from a single length of channel stock with its opposite extremities laterally bent to fit against the side edges of the cabinet top 12, whereto they are secured by fastening means such as screws 25. If desired, the cabinet may be further equipped with auxiliary work holders such as shown at 26, these being in the form of short arms which are appropriately secured so as to project diagonally from the upper rear corners of the structure, as shown in Figs. I and VI. It is to be particularly noted that the top 12 of the cabinet is of ample area for use as a work table, and along its front edge has a flush rule or scale 27 which is suitably graduated for measuring purposes.

As shown in Fig. II, the end walls 10 and the back 11 of the structure are fashioned from a blank of sheet metal, which may be either in one piece or formed into one from several sections, whereof the lower edge is turned laterally inward as at 30, 30 (Figs. I and III) to provide a continuous perimetric foot flange. The vertical front edges of the blank are bent repeatedly inward, first toward each other as at 31, Fig. II, then rearward as at 32, then again inward (or outward) as at 33, except within the limits of the lower compartments 20, where the final bends are made toward each other to form flanges 34. The tubular front columns 35 thus provided not only lend strength and rigidity to the end walls 10, but enhance the attractiveness of the cabinet, as will be apparent from Fig. I. At 36, 37, and 38, Figs. I and VII, the columns 35 are cut away or notched to receive, engage, and support the front ends of the horizontal partitions or shelves 14, 15 and the bottom 13.

The bottom 13 and partition 14 are identical in size and construction: i. e., each is struck from a rectangular blank of sheet metal with down-turned securing flanges 39 along the side and rear edges, which may be screwed or welded to the end walls 10 and the back 11 of the cabinet, and finished off along the front edge by double bending, as at 40, to afford a downturned flange for stiffening and to simulate thickness.

The intermediate horizontal partition 15 is similar to the parts 13, 14, except as to the treatment of its front edge, which is given an additional bend downward to afford a flange 41 (Fig. III) in alignment with the flanges 34 of the end walls 10.

The top 12 is made after the manner of a lid, with a downward perimetric flange 42 to lap the end and the back walls 10, 11 of the cabinet. The front portion of the top 12 is recessed or rabbeted as at 43 to take or seat the measuring rule 27 hereinbefore referred to, and terminates in a double bend 44 like that of the partition 14, with appropriate cut-outs at the ends to clear the columns 35.

The vertical partition 16 between the upper compartments 19, 19 is flanged as at 45 at the top, bottom and rear for attachment to the contiguous cabinet parts; and its front end 46 is double bent to hollow columnar formation and engaged in a central cut out in the front molding 40 of the horizontal partition 14, see Figs. IV and V.

The vertical partition 17 between the lower compartments 20, 20, is made in two component sections 47, 48, Figs. II and V, the first or major section being provided—like the partition 16—with a flange 49 that extends continuously along its top, rear and bottom edges; while at the front, it is bent laterally as at 50, then rearward at 51 and again laterally at 52, the latter bend registering with the terminal bends or flanges 41 and 34 of the column 35 at the left and the horizontal partition 15, respectively. The section 48 of the vertical partition 17 is similarly finished at the front with a triple bend designated by corresponding reference numerals. Thus continuous stop flanges are provided for the doors 21. Said doors are equipped with radial latches 53, which are operable by handles 54, and adapted to engage the stop flanges aforesaid in the manner shown in Fig. II.

It is, of course, to be understood that the cabinet of my invention is not necessarily confined to the arrangement and proportions herein shown and described. In other words, it may, obviously, be expanded either horizontally or vertically, or both, when additional storage space and humidifying compartments are required.

Having thus described my invention, I claim:

1. A cabinet of the type described, comprising a back and end walls with the lower edge laterally turned inwards to form a perimetric foot and the vertical front edges fashioned to tubulate column cross-section, with vertically spaced notches; a top having a perimetric flange lapping the end and back walls, with the front edge recessed to seat a flush measuring rule; a bottom located at an elevation above floor level and flanged downward along the front edge; horizontal partitions with their forward ends engaged in the vertically spaced notches of the columns aforesaid; vertical partitions intermediate some of the horizontal partitions, affording separate open and closable compartments; and individual false bottoms with perforate lids in said closable compartments.

2. A cabinet of the type described, composed entirely of sheet metal embodying a back and continuous end walls with the lower edge laterally turned inwards to form a continuous perimetric foot and the vertical front edges fashioned to rectangular tubulate cross-section with vertically spaced notches; a top having a perimetric flange lapping the end and back walls with the frontal edge double-channeled to provide a recess for a flush measuring rule at the front edge thereof; a bottom with down-turned securing flanges along the sides and rear edges located at an elevation above floor level and finished-off along the frontal edge by double beading; and similarly sectioned horizontal and vertical partitions subdividing the cabinet into a multiplicity of separate open and closable compartments, and said closable compartments including individual false bottoms with perforate lids, for the purposes specified.

3. A cabinet of the type described composed entirely of sheet metal embodying a back and continuous end walls with the lower edge laterally turned inwards to form a continuous perimetric foot and the vertical front edges fashioned to rectangular tubulate cross-section with vertically spaced notches; a top having a perimetric flange lapping the end and back walls with the frontal edge double-channeled to provide a recess for a flush measuring rule at the front edge thereof; a bottom with down-turned securing flanges along the sides and rear edges located at an elevation above floor level and finished off along the frontal edge by double beading; similarly sectioned horizontal partitions supported by engagement of their forward ends in the vertical spaced notches of the columns aforesaid; vertical partitions of like character intermediate some of the horizontal partitions that afford separate open and closable compartments; and individual false bottoms with perforate lids in said closable compartments.

4. A cabinet of the type described, composed entirely of sheet metal embodying a back and continuous end walls with the lower edge laterally turned inwards to form a continuous perimetric foot and the vertical front edges fashioned to rectangular tubulate cross-section with vertically spaced notches as well as opposed co-planar stop flanges; a top having a perimetric flange lapping the end and back walls with the frontal edge double-channeled to provide a recess for a flush measuring rule at the front edge thereof; a bottom with down-turned securing flanges along the sides and rear edges located at an elevation above floor level and finished-off along the frontal edge by double beading; similarly sectioned horizontal partitions supported by engagement of their forward ends in the vertical spaced notches of the tubulate columns; vertical partitions of like character intermediate some of the horizontal partitions to afford separate open and closable compartments, one of said partitions embodying lateral stop flanges aligning with the co-planar flanges aforesaid; individual false bottoms with perforate tops in the closable compartments; and doors for said compartments seating against the stop flanges aforesaid.

5. A cabinet of the type described, composed entirely of sheet metal embodying a back and continuous end walls with the lower edge laterally turned inwards to form a continuous perimetric foot and the vertical front edges fashioned to rectangular tubulate cross-section with vertically spaced notches as well as opposed co-planar stop flanges; a top having a perimetric flange lapping the end and back walls with the frontal edge double-channeled to provide a recess for a flush measuring rule at the front edge thereof; a bottom with down-turned securing flanges along the sides and rear edges located at an elevation above floor level and finished-off along the frontal edge by double-leading; similarly sectioned horizontal partitions supported by engagement of their forward ends in the vertical spaced notches of the tubulate columns; vertical partitions of like profile intermediate some of the horizontal partitions to afford separate open and closable compartments, one of said partitions embodying lateral stop flanges co-planar with the stop flanges aforesaid; hinged doors for said closable compartments seating on the stop flanges; individual false bottoms with perforate tops in the latter compartments; and diagonal projecting bars at the upper angular corners of the cabinet aforesaid.

6. A cabinet of the type described, composed entirely of sheet metal embodying a back and continuous end walls with the lower edge laterally turned inwards to form a continuous perimetric foot and the vertical front edges fashioned to rectangular tubulate cross-section with vertically spaced notches as well as opposed co-planar stop flanges; a top having a perimetric flange lapping the end and back walls with the frontal edge double-channeled to provide a recess for a flush measuring rule and a co-planarly disposed rail at the back edge thereof, a bottom with down-turned securing flanges along the sides and rear edges located at an elevation above floor level and finished-off along the frontal edge by double beading; similarly sectioned horizontal partitions supported by engagement of their forward ends in the vertical spaced notches of the tubulate columns; vertical partitions of like profile intermediate some of the horizontal partitions to afford separate open and closable compartments, one of said partitions embodying lateral stop flanges co-planar with the stop flanges aforesaid; hinged doors for said closable compartments seating on the stop flanges; individual removable humidifying pans with perforate lids in the latter compartments; and diagonal projecting bars at the upper rear angular corners of the cabinet aforesaid.

In testimony whereof, I have hereunto signed my name at Philadelphia, Pennsylvania, this 15th day of September 1930.

JOAH BROGDEN.